9202X
L. Osgood.
Cotton Picker.
Patented Oct. 27, 1835.
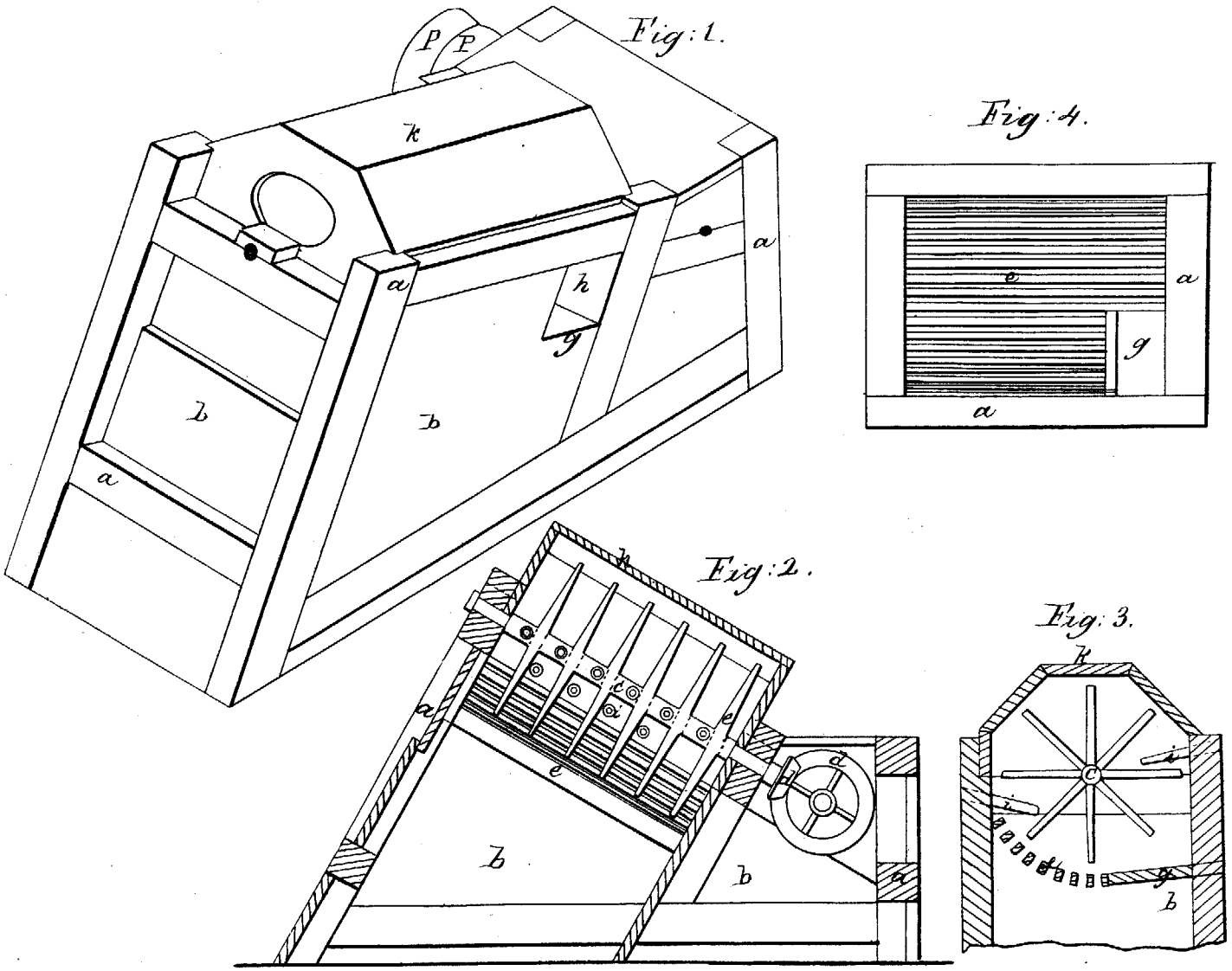
N. PETERS, PHOTO-LITHOGRAPHER, WASHINGTON, D. C.

9202X Oct. 27. 1835 No. 10

Sullivan Osgood Pomfret Conn.

Letters Patent

The Schedule referred to in these Letters Patent and making part of the same con=
=taining a description in the words of the said Sullivan Osgood himself of his
improvement in the Oblique Cotton Whipper.

To all whom it may concern. Be it known that I Sullivan Osgood of Pomfret
in the County of Windham and State of Connecticut have invented a new
and useful improvement in the mode of constructing the machine for whip=
=ping Cotton which machine so improved I denominate the "Oblique Cotton
Whipper" & I do hereby declare that the following is a full and exact des=
=cription thereof.

Although the [illegible] general arrangement my machine [illegible]
[illegible] the improvement [illegible] depending upon the whipper
shaft I have in the accompanying drawings [illegible] of it as it may
be conveniently constructed.
Fig 1st is a perspective view of the exterior of the machine: a a are the frame
of the [illegible] in which it is inclosed b the [illegible] which covers the
whippers and can be removed at pleasure. The cotton is fed in through
the opening c in the upper end of the [illegible] and discharged at the lower end at the
[illegible] opening h. PP are the fast and loose pulleys which are placed on a hori=
=zontal shaft at right angles to the whipper shaft to which it gives motion
by means of bevil gearing. Fig 2d is a longitudinal section in which d d is
the bevil gearing giving motion to e the whip shaft.

In a machine of ordinary
size this shaft may carry twenty six pairs of nine inches in length, the
shaft being about six feet ten inches in length. The whip shaft is placed at an
angle of 25° with the horizon, but in this point considerable variation may
be admitted without materially lessening the advantages derived from
its oblique position. There are two rows of stationary pins shown at i i in
the transverse section Fig 3. Fig 4 is a horizontal section of the grating 198 9202X c the bottom of the throat being seen at g. What I claim as my improve
=ment and by which the operation of the whipping machine for Cotton is
facilitated and rendered more effective than heretofore is the placing the
whip shafts of such machine obliquely so as to form an angle with the hor
=izon of twenty five or such other number of degrees as may be preferred and
this I claim whether the machine be constructed in other respects exactly in the way
herein described or any other admitting of this improvement.

Witnesses
Jno Stettinius
R R Burr

Lucian Egorre

462

(Drawing)

[illegible]